C. W. WEIDNER.
AUTOMOBILE GEARING LOCK.
APPLICATION FILED SEPT. 18, 1919.
1,362,377. Patented Dec. 14, 1920.
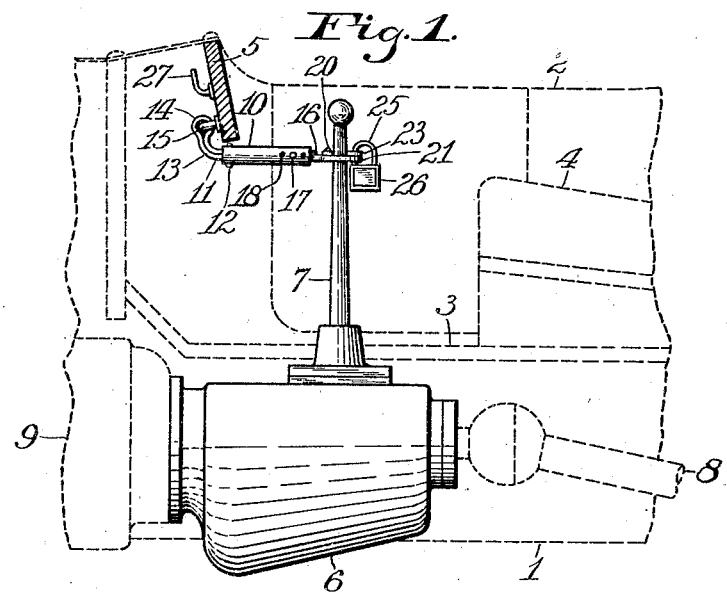
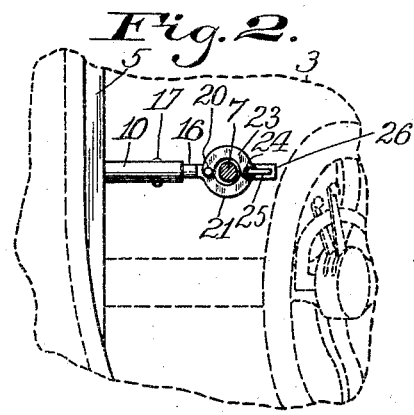
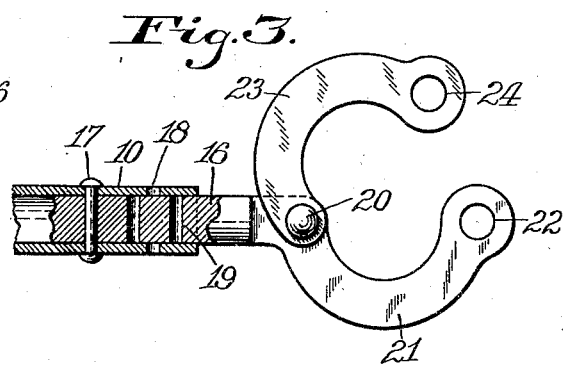
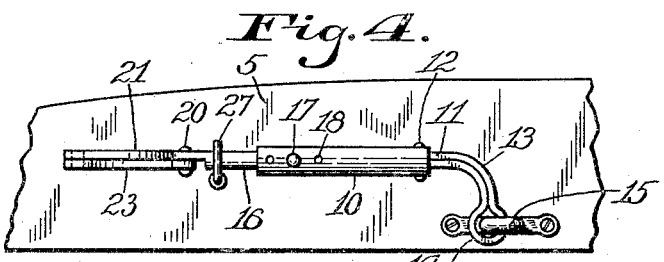
WITNESS:
Robert Liebrich
F. M. Roeder
INVENTOR:
Charles W. Weidner,
BY
E. T. Silvius,
ATTORNEY.

UNITED STATES PATENT OFFICE.

CHARLES W. WEIDNER, OF MOORESVILLE, INDIANA.

AUTOMOBILE-GEARING LOCK.

1,362,377.  Specification of Letters Patent.  Patented Dec. 14, 1920.

Application filed September 18, 1919. Serial No. 324,532.

*To all whom it may concern:*

Be it known that I, CHARLES W. WEIDNER, a citizen of the United States, residing at Mooresville, in the county of Morgan and State of Indiana, have invented a new and useful Automobile-Gearing Lock, of which the following is a specification, reference being had to the accompanying drawings and figures of reference marked thereon.

This invention relates to an appliance for motor vehicles, more particularly for such as those commonly known as automobiles, in which a transmission gearing having a shifting lever or rod is used, the invention having reference more particularly to apparatus for preventing unauthorized or illegal use of the motor vehicle.

An object of the invention is to provide means at moderate cost for locking automobile gearing to prevent the theft of the automobile. Another object is to provide an automobile gearing lock which shall be of simple construction and not costly, and which shall be adapted to be readily applied not only to new machines but to those already in use. A further object is to provide an automobile gearing lock which shall be so constructed as to be convenient for operation and which may be carried when not in use so as to not be unsightly or obstructive and yet be ready for prompt use.

With the above-mentioned and other objects in view, the invention consists in a locking bar of novel construction for securing a gear-shifting lever so that the gearing shall be inoperative; and, the invention consists also further in the parts and combinations and arrangements of parts as hereinafter particularly described and further defined in the accompanying claims.

Referring to the drawings, Figure 1 is an elevation of an automobile transmission unit in a common arrangement relatively to portions of an automobile indicated by broken lines, in connection with which the improved gearing lock is illustrated; Fig. 2 is a top plan of a portion of the automobile with which the gearing lock is associated, the top of the gear-shifting lever being broken away; Fig. 3 is a sectional plan of a portion of the gearing lock; and, Fig. 4 is a rear elevation of a portion of the instrument board of the automobile with which the gearing lock is connected, the latter being shown on the back of the instrument board as when it is not in operation.

Similar reference characters in the different figures of the drawings indicate corresponding or like elements or features of construction herein referred to in detail.

In the drawings the numeral 1 indicates an automobile frame which carries a body 2 having a floor 3 and a driver's seat 4, an instrument board 5 being arranged forward of the seat. The gear case 6 of the speed changing transmission gearing of popular type is arranged below the floor 3 and the gear-shifting lever 7 extends upward beyond the floor so that its upper portion is between the seat 4 and the instrument board 5, being in approximately vertical arrangement when in "neutral" position, in which arrangement as is well known the propeller shaft 8 is disconnected from the engine or motor 9.

The locking bar comprised in the invention preferably is adjustable longitudinally before it is applied for use, so that it may be readily made to fit in different automobiles; and to this end the locking bar comprises a tubular main member 10 into one end of which a shank 11 is secured by means of a rivet 12, the shank having an elbow 13 provided with an eye or loop 14 to which an ear 15 is connected. The ear is firmly secured to the lower portion of the back of the instrument board 5, and the elbow of the shank permits the shank to hang so that the bar may extend under the instrument board and toward the lever 7. The locking bar comprises also a rod 16 that is arranged in the main member 10 so as to extend from the opposite end thereof and is rigidly secured to the main member by means of a rivet 17. When the device is to be applied to automobiles which have gone from the factory it is preferable that the main member have several pin holes 18 and that the rod 16 have a number of pin holes 19 to receive the rivet and permit the rod to be adjusted so as to compensate for differences in the distance between the instrument board and the lever 7 in different automobiles The projecting portion of the rod 16 is provided with a hinge pin or pivot 20 and also a curved yoke member 21 having an aperture 22 to receive a padlock shackle, a reversely curved yoke portion 23 being connected at one end to the hinge pin 20 and having an aperture 24 therein which may be brought by swinging the member to the aperture 22 to receive the shackle 25 of a suitable padlock 26, whereby to lock both members of the yoke together.

The back of the instrument board 5 is provided with a suitable hanger or carrier device 27 to support the locking bar horizontally behind the instrument board and out of sight when not in use.

In practical use the gear-shifting lever 7 is brought to "neutral" or mid-position as is customary when an automobile is stopped. The locking bar is taken from the supporting device 27 and is swung down and around so as to bring the yoke member 21 to one side of the lever 7 while the yoke is open, after which the member 23 is brought to the opposite side of the lever 7, so that the apertures 22 and 24 are together after which the shackle of the padlock is inserted into the apertures and locked to the body of the padlock, thus preventing the movement of the lever 7 either forwardly or rearwardly, so that while the transmission gearing can not be made to connect the propeller shaft with the motor, the automobile can not be driven by the motor.

Having thus described the invention, what is claimed as new is—

1. An automobile gearing lock including a locking bar comprising a tubular main part and a shank and a rod rigidly secured in the main part and extending from opposite ends thereof respectively, the shank being curved and having an eye and the rod having a yoke thereon, the yoke comprising a curved member rigid on the rod and a reversely curved member hingedly connected to the rod, each yoke member having an aperture therein to receive a padlock shackle, and an ear loosely connected to the shank eye to support the locking bar with the shank extending downwardly and under or upwardly and over the ear.

2. In an automobile gearing lock, the combination with the instrument-board and the gear-shifting lever of an automobile, of a supporting device secured to the lower portion of the back of the instrument-board, an ear secured to the lower portion of the back of the instrument-board, a locking-bar having a curved shank connected loosely at its end to said ear to permit the locking bar to be inverted and to rest on said device when not in use and having also a yoke embracing the gear-shifting lever, the yoke comprising two oppositely curved coöperating members having each an aperture therein, one of said curved members being hinged to the other, and a padlock having a shackle secured in said apertures.

3. In an automobile gearing lock, the combination of a hollow cylindrical main part, a shank secured in said part and extending from one end thereof and also laterally relatively to the main part, the end of said shank having an eye thereon, an ear loosely connected with said eye to invertibly support said shank, a rod secured in said main part and extending straight away from the opposite end thereof, a pivot connected to said rod adjacent to the end thereof and on the longitudinal axis of the rod, a curved yoke member rigid on said rod adjacent to said pivot, and a reversely curved yoke member connected to said pivot.

In testimony whereof I affix my signature in presence of two witnesses.

CHARLES W. WEIDNER.

Witnesses:
CARL L. WHITE,
GAIL A. MILLS.